(12) United States Patent  (10) Patent No.: US 9,098,314 B2
Blank et al.  (45) Date of Patent: Aug. 4, 2015

(54) SYSTEMS AND METHODS FOR WEB BASED APPLICATION MODELING AND GENERATION

(75) Inventors: Guy Blank, Tel-Aviv (IL); Guy Soffer, Ra'anana (IL); Amir Naor, Ashkelon (IL); Gil Friedman, Hagefen (IL); Shahar Man, Hod Hasharon (IL)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 13/236,976

(22) Filed: Sep. 20, 2011

(65) Prior Publication Data

US 2013/0073969 A1  Mar. 21, 2013

(51) Int. Cl.
G06F 17/00 (2006.01)
G06F 9/445 (2006.01)
G06F 17/21 (2006.01)

(52) U.S. Cl.
CPC .......... G06F 9/44505 (2013.01); G06F 17/211 (2013.01)

(58) Field of Classification Search
CPC .............................. G06F 17/212; G06F 17/211
USPC .................................................. 715/273, 200
See application file for complete search history.

(56) References Cited

U.S. PATENT DOCUMENTS

| | | | |
|---|---|---|---|
| 6,601,234 B1 * | 7/2003 | Bowman-Amuah | 717/108 |
| 7,428,582 B2 * | 9/2008 | Bean et al. | 709/218 |
| 8,082,491 B1 * | 12/2011 | Abdelaziz et al. | 715/234 |
| 8,340,948 B1 * | 12/2012 | Song et al. | 703/6 |
| 8,356,056 B2 * | 1/2013 | Schlarb et al. | 707/793 |
| 8,504,644 B2 * | 8/2013 | Shu et al. | 709/217 |
| 8,595,246 B2 * | 11/2013 | Fay et al. | 707/758 |
| 8,626,627 B2 * | 1/2014 | Ransom et al. | 705/35 |
| 8,683,526 B2 * | 3/2014 | Ruiz-Velasco et al. | 725/50 |
| 2004/0015778 A1 * | 1/2004 | Britton et al. | 715/500 |
| 2004/0015893 A1 * | 1/2004 | Banavar et al. | 717/138 |
| 2004/0143795 A1 * | 7/2004 | Matsuishi | 715/530 |
| 2004/0181779 A1 * | 9/2004 | Gorti | 717/120 |
| 2005/0010477 A1 * | 1/2005 | Sullivan et al. | 705/14 |
| 2006/0195441 A1 * | 8/2006 | Julia et al. | 707/5 |
| 2007/0028278 A1 * | 2/2007 | Sigmon et al. | 725/113 |
| 2007/0143711 A1 * | 6/2007 | van Wyk et al. | 715/838 |
| 2007/0179646 A1 * | 8/2007 | Dempski et al. | 700/83 |
| 2007/0266054 A1 * | 11/2007 | Stephens et al. | 707/200 |
| 2008/0027878 A1 * | 1/2008 | Street et al. | 705/78 |
| 2008/0320081 A1 * | 12/2008 | Shriver-Blake et al. | 709/205 |

(Continued)

OTHER PUBLICATIONS

Carey et al., Data Delivery in a Service-Oriented World: The BEA AquaLogic Data Services Platform, ACM 2006, pp. 695-705.*

(Continued)

*Primary Examiner* — Cong-Lac Huynh
(74) *Attorney, Agent, or Firm* — Buckley, Maschoff & Talwalkar LLC

(57) ABSTRACT

According to some embodiments, a service list including a plurality of available services is displayed via a web-based display on a remote client device. Each available service may be, for example, associated with meta-data available at a server. A user selection of at least one of the available services may then be received. A platform list, including a plurality of potential execution platforms, may be displayed to the user and a user selection of one of the potential execution platforms may be received. The server may then automatically generate application code based on the selected available service, the meta-data associated with the selected available service, and the selected execution platform.

21 Claims, 13 Drawing Sheets

(56) References Cited

U.S. PATENT DOCUMENTS

| | | | |
|---|---|---|---|
| 2009/0055436 A1* | 2/2009 | Ayeni | 707/104.1 |
| 2009/0063522 A1* | 3/2009 | Fay et al. | 707/100 |
| 2009/0070344 A1* | 3/2009 | Espelien | 707/10 |
| 2009/0171917 A1* | 7/2009 | Chou | 707/3 |
| 2009/0199247 A1* | 8/2009 | Kanbe | 725/87 |
| 2009/0228804 A1* | 9/2009 | Kim et al. | 715/745 |
| 2010/0070896 A1* | 3/2010 | Attinger | 715/765 |
| 2010/0125567 A1* | 5/2010 | Morris | 707/722 |
| 2010/0235782 A1* | 9/2010 | Powell et al. | 715/809 |
| 2011/0035662 A1* | 2/2011 | King et al. | 715/273 |
| 2011/0093949 A1* | 4/2011 | Macrae | 726/19 |
| 2011/0099525 A1* | 4/2011 | Krysiuk et al. | 715/849 |
| 2011/0153600 A1* | 6/2011 | Osterwalder et al. | 707/723 |
| 2011/0196775 A1* | 8/2011 | Gavin et al. | 705/37 |
| 2012/0004968 A1* | 1/2012 | Satyavolu et al. | 705/14.17 |
| 2012/0123992 A1* | 5/2012 | Randall | 706/50 |
| 2012/0221503 A1* | 8/2012 | Williamson | 706/47 |
| 2012/0291009 A1* | 11/2012 | Khare et al. | 717/109 |
| 2012/0317214 A1* | 12/2012 | Brunner | 709/206 |
| 2012/0330777 A1* | 12/2012 | Sathish et al. | 705/26.7 |
| 2012/0330943 A1* | 12/2012 | Weber et al. | 707/723 |
| 2013/0080867 A1* | 3/2013 | Vandervort et al. | 715/205 |
| 2013/0136089 A1* | 5/2013 | Gillett et al. | 370/329 |
| 2013/0136316 A1* | 5/2013 | Grassel et al. | 382/115 |
| 2013/0198156 A1* | 8/2013 | Penikis | 707/705 |
| 2013/0212112 A1* | 8/2013 | Blom et al. | 707/741 |
| 2013/0304922 A1* | 11/2013 | Jackson et al. | 709/225 |
| 2014/0223333 A1* | 8/2014 | Pegg et al. | 715/753 |
| 2014/0304505 A1* | 10/2014 | Dawson | 713/165 |
| 2014/0304682 A1* | 10/2014 | Taylor et al. | 717/113 |

OTHER PUBLICATIONS

McIlraith et al., Semantic Web Services, IEEE 2001, pp. 46-53.*

O'Brien et al., Quality Attributes for Services-Oriented Architectures, IEEE 2007, pp. 1-7.*

* cited by examiner

500

AVAILABLE SERVICES: Select the objects you would like to use for your application below and click "Generate Consumer Package" button.

| Generate Consumer Package |   SERVICE NAME: | employee | SEARCH |

+□ Employee
    +□ W_EMP_ADDRESS (Details)
    +□ W_EMP_COMMUNICATION (Details)
        +□ get
            Input Parameters
            -□ Output Parameters
                ☑ Employee phone number
                ☑ Employee fax number   — 510
                ☑ Employee email
    +□ W_EMP_EMPLOYEE (Details)

```
┌─────────────────────────────────────────────────────────────────┐
│                   GENERATE CONSUMER PACKAGE                     │
│                                                                 │
│         ┌─────────────────────────────────────────────┐         │
│         │           Development Platform:             │         │
│         └─────────────────────────────────────────────┘         │
│                                                                 │
│  Mobile:   │ iPhone  │  Android  │  BlackBery  │ Windows Phone │ │
│                                                                 │
│  Web:      │  PHP    │  ASP.NET  │   Rails   │                  │
│                                                                 │
│         ┌─────────────────────────────────────────────┐         │
│         │              Generated Package:             │         │
│         └─────────────────────────────────────────────┘         │
│                                                                 │
│  Start from:  │ Framework Components │ Instant-Value Application │
│                                                                 │
│         ┌─────────────────────────────────────────────┐         │
│         │                 UI Template:                │         │
│         └─────────────────────────────────────────────┘         │
│                                                                 │
│  List Type:   │  Generic Table  │    Alphabetical List    │ ─┐  │
│                                                              ├─ 710
│  App Name:    │                 │                         │ ─┘  │
│                                                                 │
│                                              │ GENERATE │       │
└─────────────────────────────────────────────────────────────────┘
```

FIG. 7

```
File  Edit  View  Window    Help
Xcode    Project      Build    Run   Design     SCM                                          Sun 3:08 PM
Simulator – 4.0 Release GW_S    Employee DetailsViewController – iPhoneStarterKtApp
Bookmarks   Build
```

| Groups and Files | File Name |
|---|---|
| iPhoneStarterKitApp | Default.png |
|   Classes | EmployeeDetails.xib |
|   SAP Services | EmployeeListView.xib   ⎯ 810 |
|   Framework | GWDTTester-info.pist |
|   Employee | MarWindow.xib |
|   EmployeeDetails | sap.jpg |
|   GWDTTesterApp | |
|   EmployeeListView | EmployeeDetailsCiewController |
|   Other Srevices | } |
|   main.m | else if {"key==@phone_number"){ |
|   SAP.jpg | NSString *filedvalue = [[objectArray obectAtIndex:indexPath.secontion] get Field |
|   EmployeeDetail.xlb | [phone replacecurrenciesDtString:=@" " |
|   Targets | options:NSLiteralSearch |
|   GW Sample App | range:NSMakeRange{@, phone length1}] |
|   Executables | withString:@""] |
|   Find Results | [phone replacecurrenciesDtString:=@" " |
|   Bookmarks] | options:NSLiteralSearch |
|   SCM | range:NSMakeRange{@, phone length1}] |
|   Project Symbols | withString:@""] |
|   Implementation Files | |
| | NSURL url = [NSURL URLWithString]    820 |

| SERVICE ID 1302 | LABEL 1304 | TYPE 1306 | VALUE 1308 | META-DATA 1310 |
|---|---|---|---|---|
| S_131 | EE - PHONE | OUTPUT PARAMETER | (212) 555-1234 | TELEPHONE NUMBER |
| S_132 | EE - FAX | OUTPUT PARAMETER | (212) 555-5678 | FAX NUMBER |
| S_133 | EE - EMAIL | OUTPUT PARAMETER | JONES@EMAIL.COM | EMAIL ADDRESS |
| S_134 | EE - ADDRESS | OUTPUT PARAMETER | 12 MAIN STREET, NEW YORK USA | POSTAL ADDRESS |

SYSTEMS AND METHODS FOR WEB BASED APPLICATION MODELING AND GENERATION

FIELD

Some embodiments relate to systems and methods associated with the creation of applications for execution platforms. More specifically, some embodiments are directed to systems and methods providing web based application modeling and generation for execution platforms.

BACKGROUND

A business or other entity may store relatively large amounts of enterprise data. For example, a company might store information about employees, sales orders, etc. in one or more databases or data warehouses. In some cases, it may be helpful to have a program or application that lets a user access and/or interact with the enterprise data. For example, an application that helps users determine contact information for employees could be useful. Developing such applications, however, can be a time consuming and difficult process. For example, a skilled software developer might need a deep understanding of enterprise services associated with the data (e.g., web services). Moreover, such applications may need to execute on several different platforms (e.g., iOS and ASP-.NET platforms). As a result, a developer might need to understand multiple integrated development environments associated with various platform technologies. This complicated process can result in a relatively high Total Cost of Development ("TCD") for such applications.

Accordingly, a method and mechanism to efficiently, accurately, and automatically provide web based application modeling and generation may be provided in accordance with some embodiments described herein.

BRIEF DESCRIPTION OF THE DRAWINGS

FIG. 5 illustrates a user selection display in accordance with some embodiments.

FIG. 7 illustrates a user interface template display in accordance with some embodiments.

FIG. 8 illustrates an integrated development environment display according to some embodiments.

FIG. 13 is a portion of a tabular service N meta-data database in accordance with some embodiments.

DETAILED DESCRIPTION

A business or other entity may store relatively large amounts of enterprise data. For example, a company might store information about employees, sales orders, etc. in one or more databases or data warehouses. In some cases, it may be helpful to have a program or application that lets a user access and/or interact with the enterprise data. For example, an application that helps users determine contact information for employees could be useful. Developing such applications, however, can be a time consuming and difficult process. For example, a skilled software developer might need a deep understanding of enterprise services associated with the data (e.g., web services). Moreover, such applications may need to execute on several different platforms, and, as a result, a developer might need to understand integrated development environments associated with various platform technologies.

Figure 1:
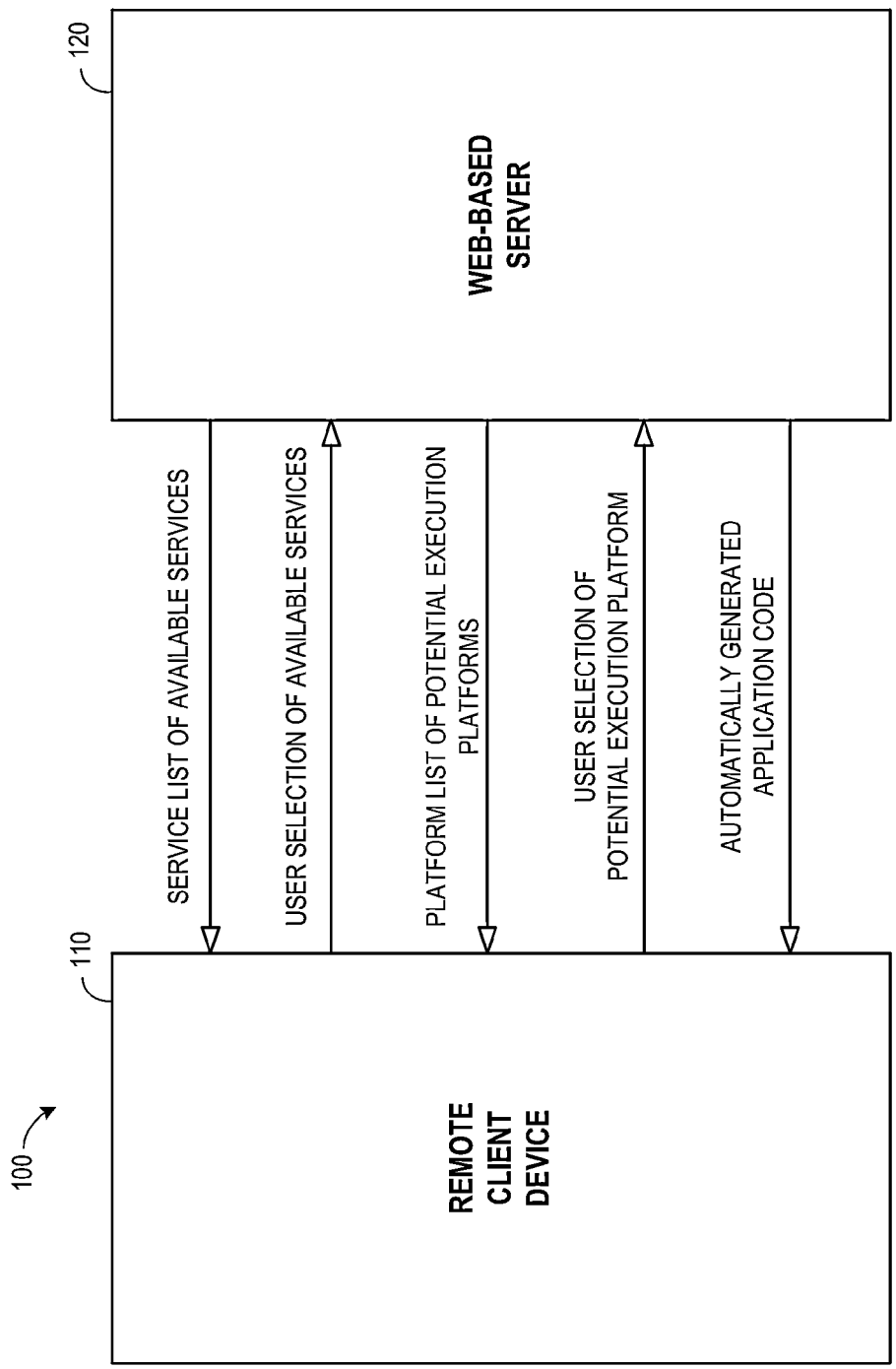
FIG. 1 is a block diagram of a system according to some embodiments.

Accordingly, a method and mechanism to efficiently, accurately, and automatically provide web based application modeling and generation may be provided in accordance with some embodiments described herein. For example, FIG. 1 is a block diagram of a system 100 that includes a remote client device 110 in communication with a web-based server 120. The remote client device 110 and/or web-based server 120 may comprise, for example, Personal Computers (PCs), laptop computers, servers, wireless smart phones, television based systems, or another other appropriate device.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the remote client device 110 and web-based server 120, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

All systems and processes discussed herein may be embodied in program code stored on one or more non-transitory computer-readable media. Such media may include, for example, a floppy disk, a CD-ROM, a DVD-ROM, magnetic tape, solid state Random Access Memory ("RAM") or Read Only Memory ("ROM") storage units. Embodiments are therefore not limited to any specific combination of hardware and software.

According to some embodiments, the web-based server 120 may transmit a list of available services to the remote client device 110. A user may then select one or more of the available services. The web-based server 120 may also transmit a list of potential execution platforms to the remote client device 110. A user may then select one of the potential execution platforms. Based on the selected service or services and the selected execution platform, the web-based server 120 may automatically generate application code to be transmitted to the remote client device 110. Note that in some embodiments, the system 100 may further provide for modeling of the application. For example, an application modeler component may let a user model an application based on a selected service and associated meta-data (e.g., in connection with mapping layout user interface elements to service models).

Thus, a web-based platform may allow developers to discover and/or browse through different services (e.g., a customer list web service or sales order list web service). The service may, according to some embodiments, implement some type of meta-data. For example, the service may implement Open Data Protocol ("OData") meta-data that provides a web protocol for querying and updating information for a variety of applications, services, and stores. The user may then design a front end application flow by selecting User Interface ("UI") elements and corresponding data from the selected service. Moreover, fully working application code for a specific platform (e.g., iPhone, ASP.NET, Android, PHP, etc) may then be generated by the web-based server 120. According to some embodiments, a web application may therefore be provided such that no installation is required on the client side. Further, some embodiments may extend supported front end platforms for modeling and generation.

Figure 2:
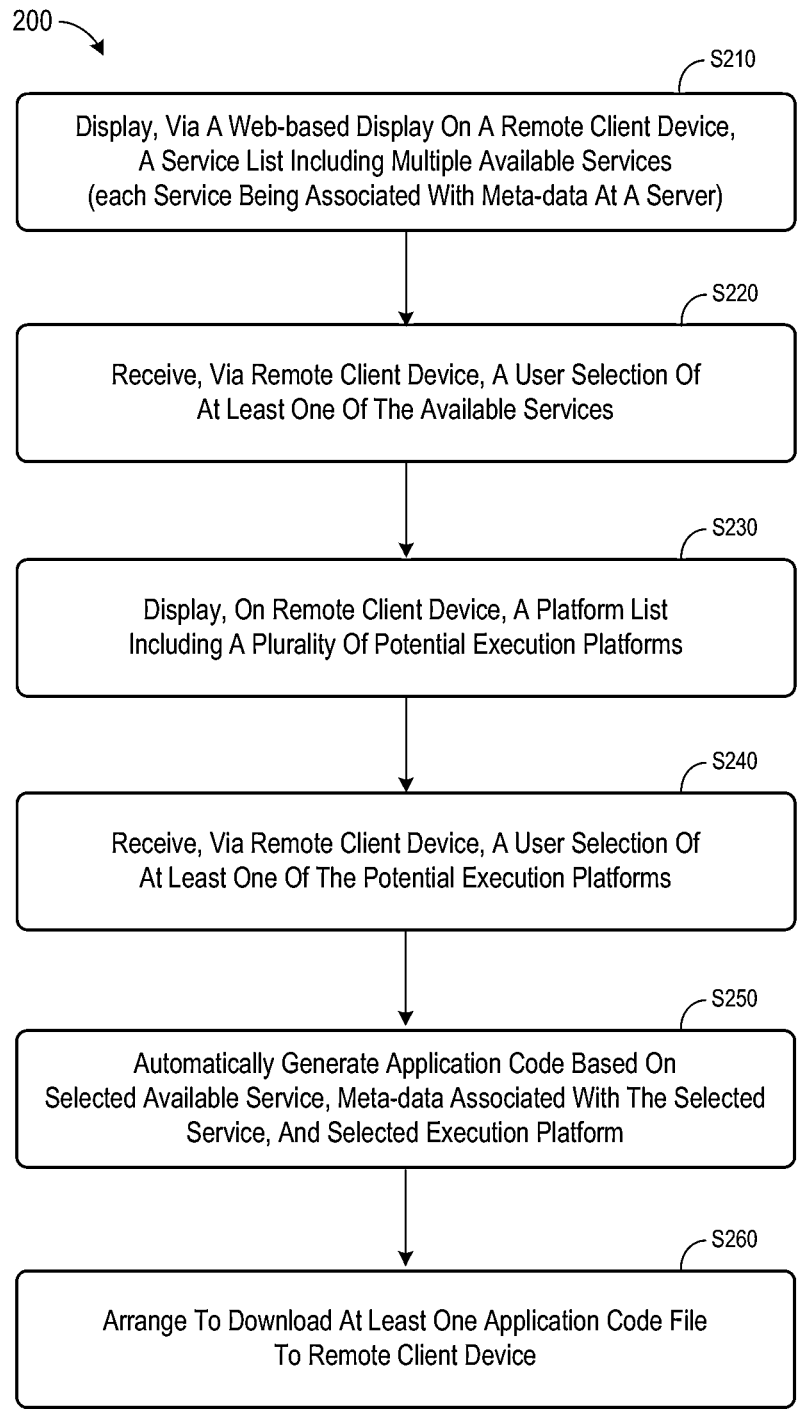
FIG. 2 is a flow diagram of a process according to one embodiment that might be implemented.

FIG. 2 is a flow diagram of a process 200 that might be associated with the system 100 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, a service list may be displayed via a web-based display on a remote client device. The service list may include a plurality of available services, each available service being associated with meta-data available at a server. The available services might include, for example, an enterprise service, a web service, a customer list web service, a sales order list web service, and/or an employee list web service. According to some embodiments, the display of available services is performed in response to a search request entered by the user via the remote client device.

The meta-data associated with the available services might include, for example, OData information, an association between an entity and a service, (iii) a text label of a property entity, or supported page layouts for entities. According to some embodiments, the meta-data comprises one or more semantic attributes, such as an indication that a data field is associated with a telephone number. As other example, the meta-data might comprise an indication that a data field is associated with an email address or an indication that a data field is associated with a Uniform Resource Locator address ("URL"). As still another example, the meta-data might be associated with Business Object ("BO") information. At S220, a user selection of at least one of the available services may be received via the remote client device.

At S230, a platform list including a plurality of potential execution platforms may be displayed on the remote client device. The potential execution platforms might include, for example, a wireless telephone, a smartphone, a hypertext preprocessor platform, an application service provider device, and/or a platform-specific operating system. At S240, a user selection of one of the potential execution platforms may be received via the remote client device. According to some embodiments, a user selection of a generic table user interface template and/or a list style user interface template may also be received.

At S250, the server may automatically generate application code based on the selected available service, the meta-data associated with the selected available service, the selected execution platform, and user modeling. At S260, the server may arrange to download at least one application code file to the remote client device. The downloaded application code file might be associated with, for example, integrated development environment application. According to some embodiments, the downloaded file represents a stand-alone application, proxy code, or a framework component that can run on the selected execution platform.

Figure 3:
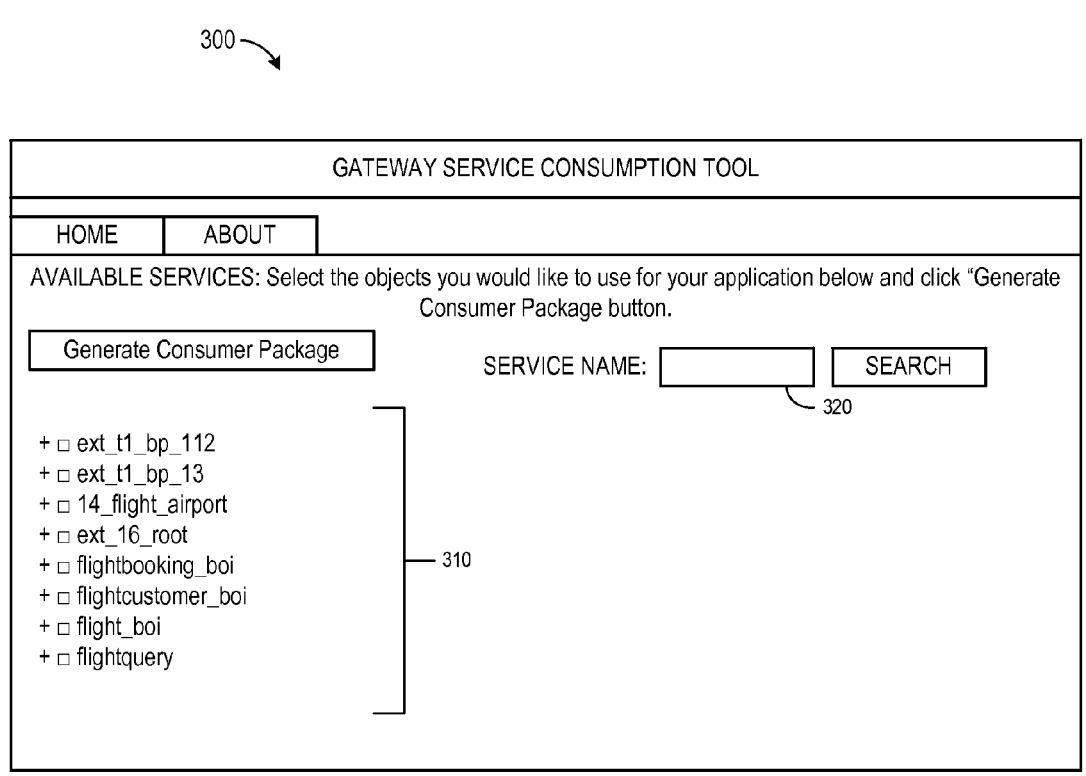
FIG. 3 illustrates a gateway service consumption tool display according to some embodiments.

According to some embodiments, a service list is displayed via a web-based display on a remote client device. For example, FIG. 3 illustrates a gateway service consumption tool display 300 that might be associated with, for example, a browser executing on a PC according to some embodiments. The display includes a service list 310 with a plurality of available services, each available service being associated with meta-data available at a server. The available services in the service list 310 might include, for example, a customer list web service, a sales order list web service, and/or an employee list web service. According to some embodiments, the display of available services is performed in response to a search request entered by the user in a text search box 320.

Figure 4:
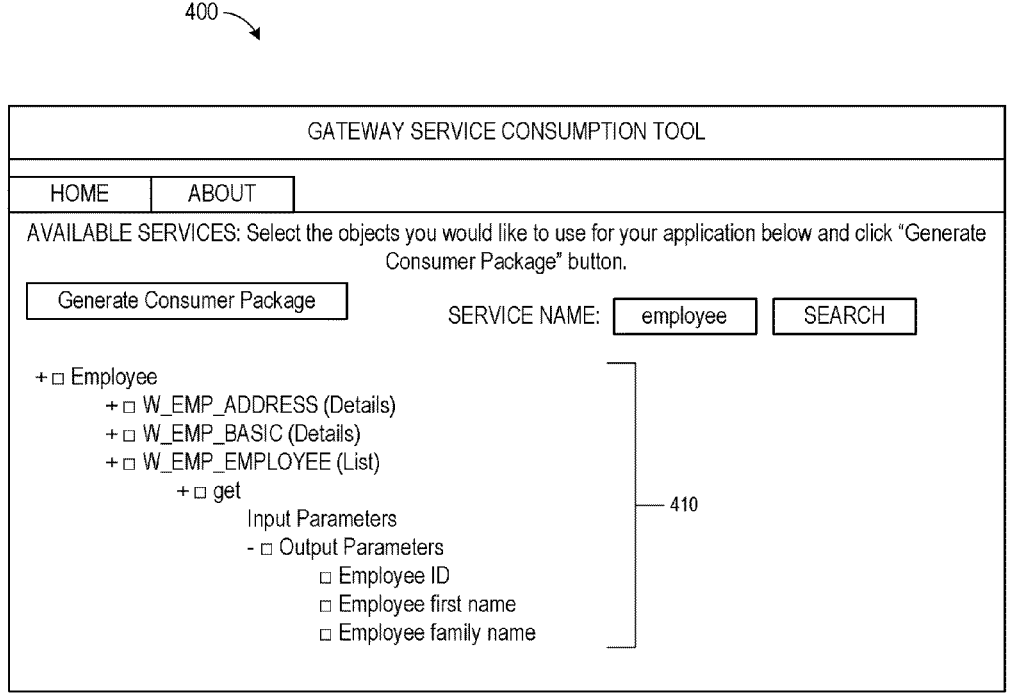
FIG. 4 illustrates a search result service list display in accordance with some embodiments.

Consider, for example, a user who types "employee" in the text search box 320 and selects the "Search" icon. In this example, FIG. 4 illustrates a search result service list display 400 in accordance with some embodiments. In particular, a service list 410 portion of the display includes available services matching that text. Note that the services in the service list 410 may include details, lists, input parameters, output parameters, etc.

According to some embodiments, a user selection of at least one of the available services in the services list 410 may be received via the display. For example, FIG. 5 illustrates a user selection display 500 in accordance with some embodiments. In this example, a user has used a check box to select three of the available fields as selected fields 510: employee phone number, employee fax number, and employee email. Note that meta-data stored at a service might indicate that these serves represent these types of information.

Figure 6:
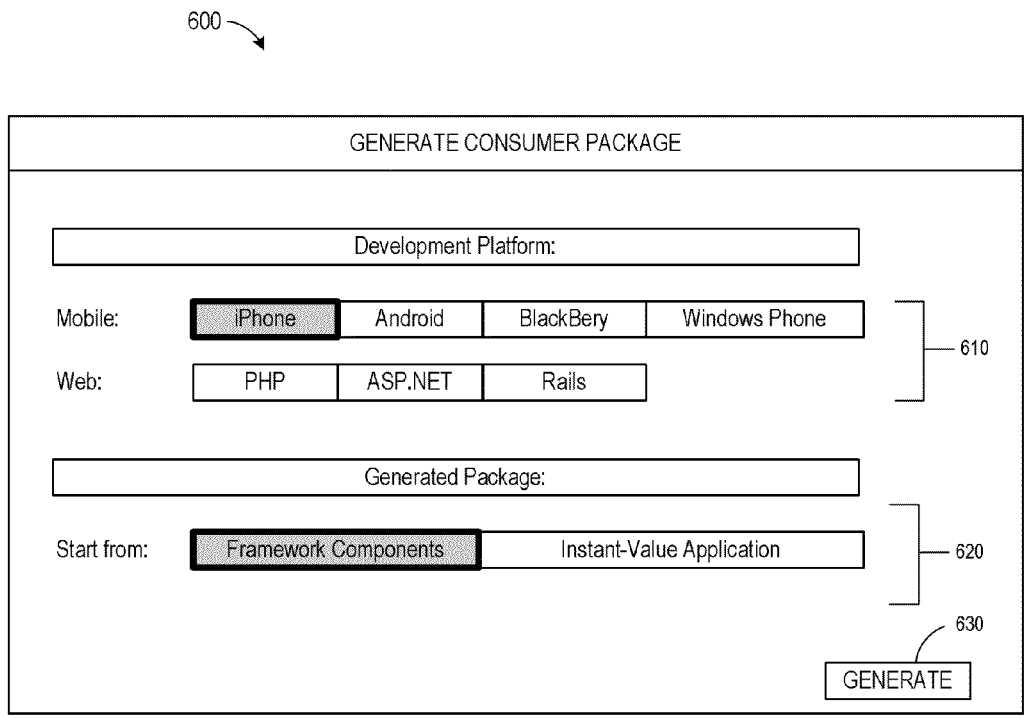
FIG. 6 illustrates a consumer package generation display according to some embodiments.

The user may then select a "Generate Consumer Package" button on the display. For example, FIG. 6 illustrates a consumer package generation display 600 according to some embodiments. In particular, the consumer package generation display 600 includes a platform list 610 having a plurality of potential execution platforms. The potential execution platforms might include, for example, mobile platforms (e.g., iPhones, Androids, Blackberries, or Windows phones) and web platforms (e.g., PHP, ASP.NET, or Rails platforms). A user selection of one of the potential execution platforms may then be received via the display 600. According to some embodiments, a user selection of a generated packaging starting from framework components or an instant-value application 620 may also be received via the display 600.

The user may then activate a "Generate" button 630 on the display, and the server may automatically generate application or framework component code based on the selected available service, the meta-data associated with the selected available service, and the selected execution platform. FIG. 7 illustrates a user interface template display 700 in accordance with some embodiments. According to some embodiments, the user may further select a UI template 710, such as a generic table format or an alphabetical list format, for the application being automatically generated by the server.

According to some embodiments, the server may arrange to download at least one application code file to the remote client device. For example, a user might enter an application name and general configuration information via the display 700 to be associated with the file. The downloaded application code file might be associated with, for example, integrated development environment application. For example, FIG. 8 illustrates an integrated development environment display 800 according to some embodiments. In this example, a number of files 810 have been downloaded, and some of the files might include code 820 that can be executed by a platform. According to other embodiments, a downloaded file might represent proxy code, or a framework component that can run on the selected execution platform.

Figure 9:
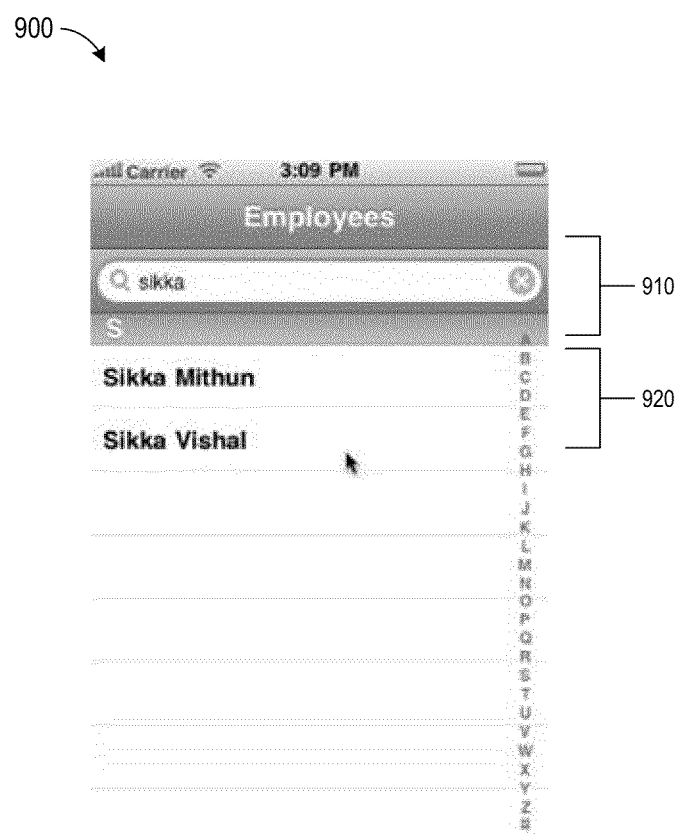
FIGS. 9 and 10 illustrate a hand held application display in accordance with some embodiments.
Figure 10:
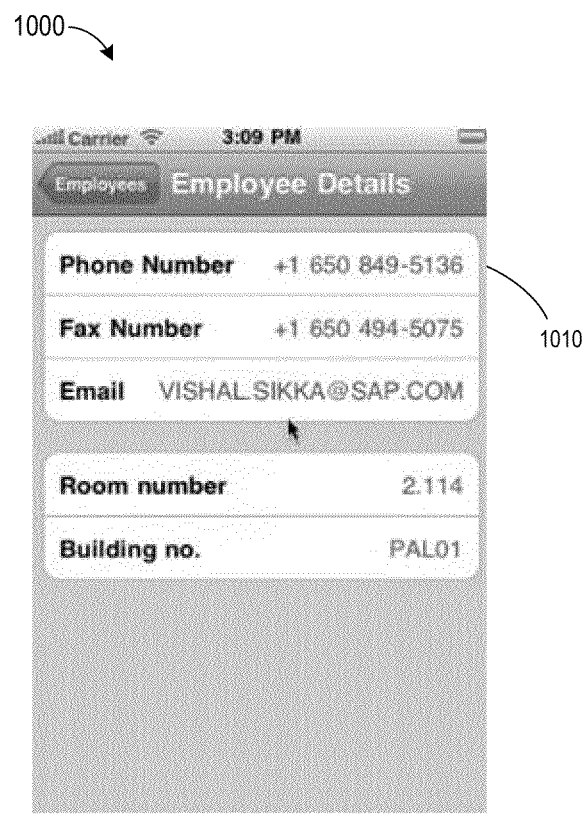

The code 820 might, for example, provide an employee information application display 900 such as the one illustrated in FIG. 9. The application display 900 includes a search portion 910 where a user can enter text. The display 900 also includes a result portion 920 listing employees whose names match the entered text. The user may select one of the results in the result portion 920 to access a detailed employee information display 1000 such as the one illustrated in FIG. 10. In particular, contact information such as a phone number 1010, fax number, and email address might be displayed for the selected employee. Note that meta-data might have indicated that the value of the phone number 1010 comprise digits that can be dialed on a telephone. In this way, selecting the phone number 1010 on the employee information display 1000 might result in a telephone call being automatically placed to that number.

Figure 11:
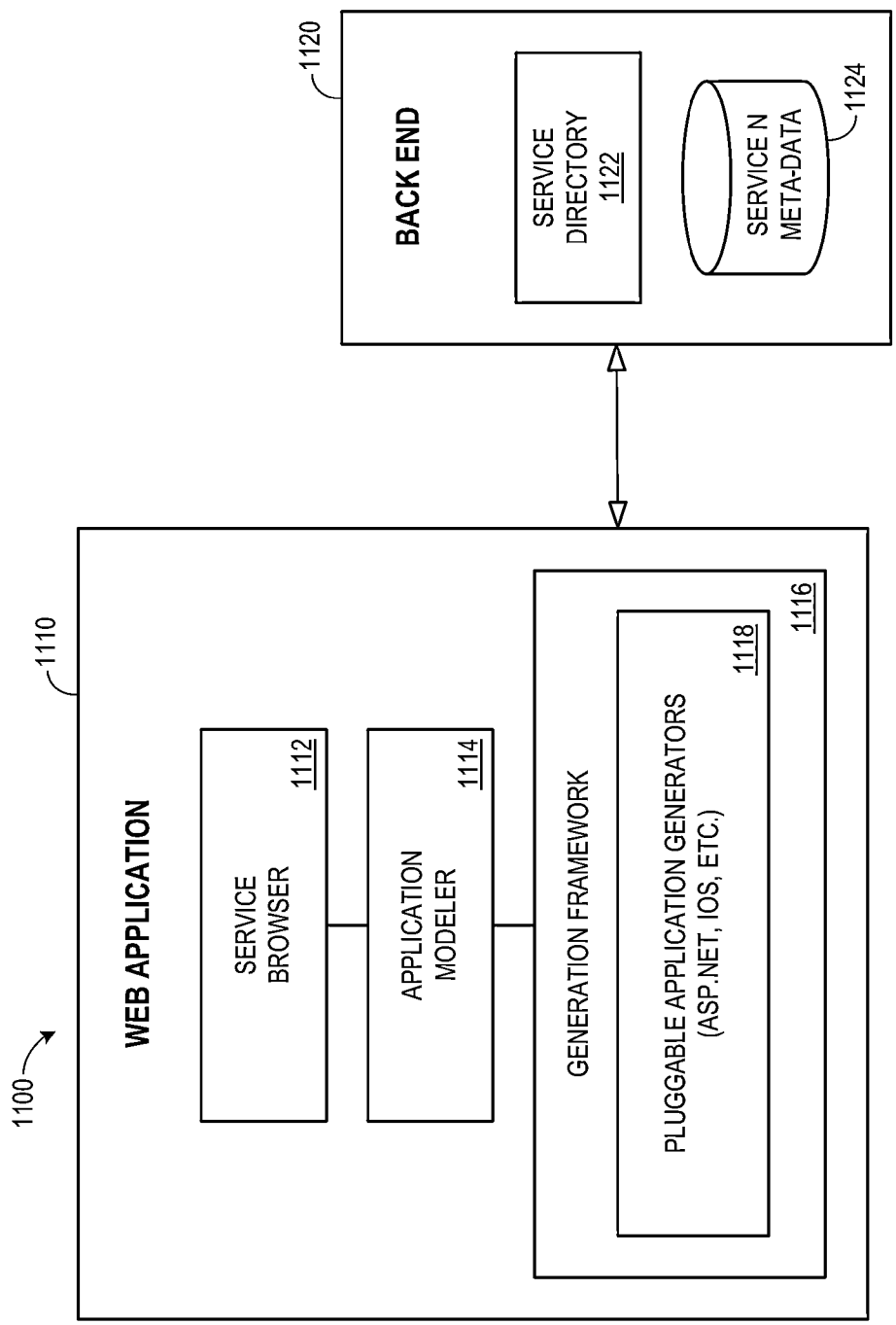
FIG. 11 is a block diagram of a system according to some embodiments.

Embodiments described herein can be associated with a number of different system layouts and arrangements. For example, FIG. 11 is a block diagram of a system 1100 according to some embodiments. The system 1100 includes a web application 1110 in communication with a back end 1120 storing a service directory 1122 and service N meta-data 1124.

A user may open his or her browser and navigate to the web application. The a service browser 1112 in the web application communicates with the service directory 1122 in the back end 1120 in order to get the list of available services. For each available service, the service browser 1112 may also fetch the appropriate service N meta-data 1124. This information may be displayed to the user to let him or her explore and the available services (e.g., by searching for a service name or an object).

An application modeler component 1114 may let the user model an application based on the selected service and its meta-data. An application might be associated with, for example, pages where each page can have a different layout (e.g., a list layout or a details layout). The application modeler 1114 may, according to some embodiments, allow mapping between the layout UI elements and the service models (e.g., binding a page list with a collection of banks).

The application modeler 1114 may leverage information that can be found in the meta-data. Some examples might include: associations between entities and services, text labels of property entities, supported page layouts for different entities, and semantic attributes (e.g., indicating that an entity property is a telephone number rather than just a number). Thus, application modeler may provide a simple and intuitive way for building applications constructed from pages (as well as the navigation between them).

A generation framework 1116 may allow the user to select a designated platform (e.g., associated with a pluggable application generator 1118 for iOS, ASP.NET, Blackberry, etc.). Based on this selection and the application model from the modeler 1114, the generation framework 1116 may generate a complete downloadable application code (such as IDE project files and source code files consists from UI elements and logic, data service calls, etc.). According to some embodiments, the generation framework 1116 is pluggable and therefore allows extending embodiments to additional target platforms (e.g., PHP platforms).

Figure 12:
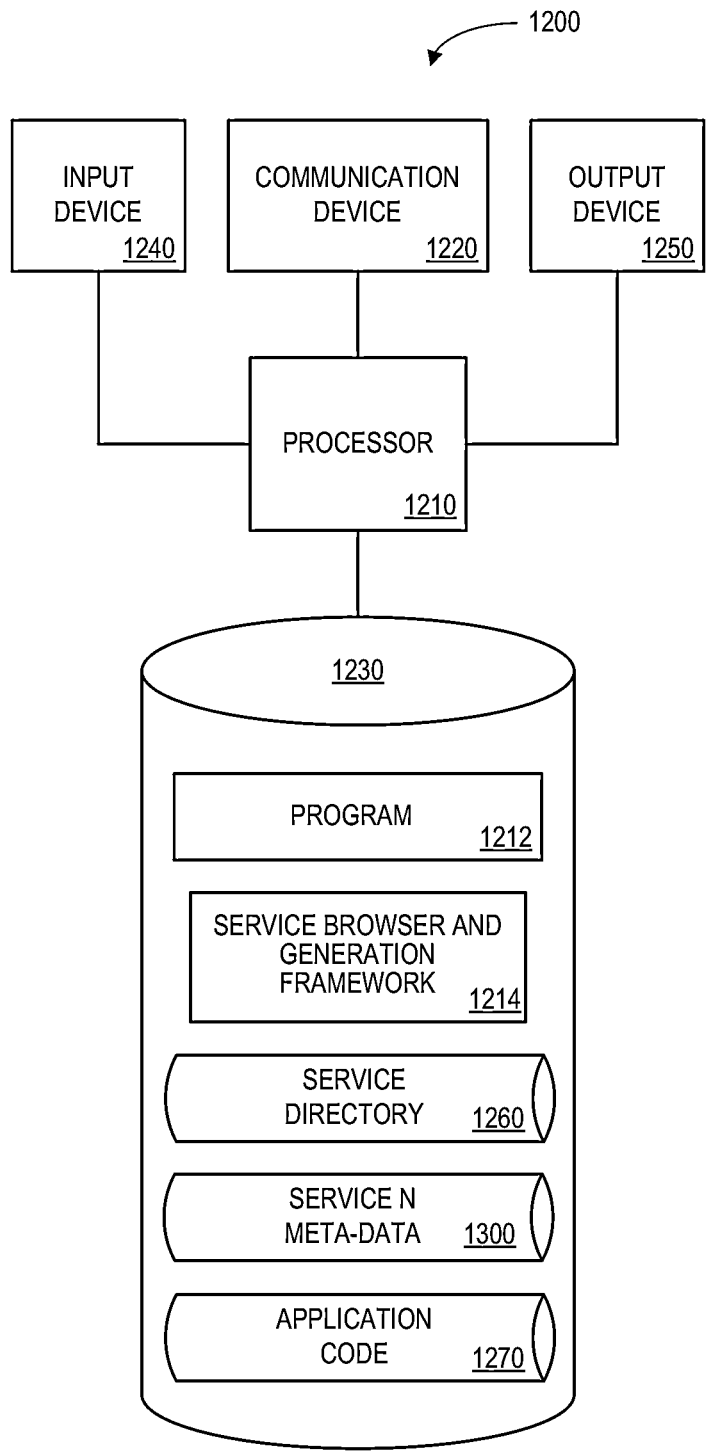
FIG. 12 is a block diagram of a web based application modeling and generation platform according to some embodiments.

FIG. 12 is a block diagram overview of a system 1200 according to some embodiments. The system 1200 may be, for example, associated with the systems 100, 1100 described with respect to FIGS. 1 and 11, respectively. The system 1200 comprises a processor 1210, such as one or more commercially available Central Processing Units (CPUs) in the form of one-chip microprocessors, coupled to a communication device 1220 configured to communicate via a communication network (not shown in FIG. 12). The system 1200 further includes an input device 1240 (e.g., a mouse and/or keyboard to enter information about potential execution platforms) and an output device 1250 (e.g., a computer monitor to display aggregated information applications).

The processor 1210 communicates with a storage device 1230. The storage device 1230 may comprise any appropriate information storage device, including combinations of magnetic storage devices (e.g., a hard disk drive), optical storage devices, and/or semiconductor memory devices. The storage device 1230 stores a program 1212 and/or service browser and generation framework 1214 for controlling the processor 1210. The processor 1210 performs instructions of the programs 1212, 1214, and thereby operates in accordance with any of the embodiments described herein. For example, the processor 1210 may arrange for a service list including a plurality of available services to be displayed via a web-based display on a remote client device. Each available service may be, for example, associated with meta-data available. A user selection of at least one of the available services may then be received. A platform list, including a plurality of potential execution platforms, may be displayed to the user, and a user selection of one of the potential execution platforms may be received. The processor 1210 may then automatically generate application code based on the selected available service, the meta-data associated with the selected available service, and the selected execution platform.

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the system 1200 from another device; or (ii) a software application or module within the system 1200 from another software application, module, or any other source.

In some embodiments (such as shown in FIG. 12), the storage device 1230 stores a service directory 1260, service N meta-data (described with respect to FIG. 13), and application code 1270. An example of a database that may be used in connection with the system 1200 will now be described in detail with respect to FIG. 13. Note that the database described herein is only examples, and additional and/or different information may be stored therein. Moreover, various databases might be split or combined in accordance with any of the embodiments described herein.

Referring to FIG. 13, a table is shown that represents the service N meta-data 1300 that may be stored at the system 1200 according to some embodiments. The table may include, for example, entries identifying available services that may be selected for an application. The table may also define fields 1302, 1304, 1306, 1308, 1310 for each of the entries. The fields 1302, 1304, 1306, 1308, 1310 may, according to some embodiments, specify: a service identifier 1302, a label 1304, a type 1306, a value 1308, and meta-data 1310. The information in the service N meta-data may be created and updated, for example, based on data received from an administrator or an enterprise database or application.

The service identifier 1302 may be, for example, a unique alphanumeric code identifying a service that might be available for an application being automatically generated for a remote user. The label 1304 may comprise text associated with that service while the type 1306 may define whether the service is associated with an output parameter, input parameter, etc. The value 1308 may store a data value associated with the service identifier 1302, and the meta-data 1310 may indicate that the service identifier 1302 represents a telephone number, email address, etc.

Thus, some embodiments may provide a method and mechanism to efficiently, accurately, and automatically generate applications for remote users. Moreover, embodiments may provide simple exploration and discovery of services to be used to create the applications. As a result, relatively rapid application development, targeting multiple platforms, may be provided in accordance with embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of applications, note that embodiments may be associated with other types of application. For example, interactive applications wherein users may alter information may be processed in accordance with any of the embodiments described herein.

Moreover, while embodiments have been illustrated using a server side approach, note that other embodiments may provide for some or all of the functions to be implemented on the client side. For example, a program executing at the client might automatically generate application code to be executed on various platforms.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, comprising:
   displaying, via a web-based display on a remote client device, a service list including a plurality of available services, each available service being associated with meta-data available at a server;
   receiving, via the remote client device, a selection, by a first user, of at least one of the available services;
   displaying, on the remote client device, a platform list including a plurality of potential execution platforms;
   receiving, via the remote client device, a selection, by the first user, of one of the potential execution platforms;
   displaying, on the remote client device, a list including a plurality of potential user interface formats for a user interface on the selected one of the potential execution platforms;
   receiving, via the remote client device, a selection, by the first user, of one of the potential user interface formats for a user interface on the selected one of the potential execution platforms; and
   automatically generating, by the server, application code based on the first user's selection of at least one of the available services, the meta-data associated with the selected at least one of the available services, the first user's selection of one of the potential execution platforms and the first user's selection of one of the potential user interface formats for a user interface on the selected one of the potential execution platforms;
   wherein the application code automatically generated by the server based on the first user's selection of at least one of the available services, the meta-data associated with the selected at least one of the available services, the first user's selection of one of the potential execution platforms and the first user's selection of one of the potential user interface formats for a user interface on the selected one of the potential execution platforms includes code to allow multiple users to access and alter data from an enterprise database without a requirement for re-display of the service list that: (i) was displayed on the remote client device prior to automatically generating the application code and (ii) included the plurality of available services.

2. The method of claim 1, wherein at least one of the available services comprise at least one of: (i) an enterprise service, (ii) a web service, (iii) a customer list web service, (iv) a sales order list web service, or (v) an employee list web service.

3. The method of claim 1, wherein the display of available services is performed in response to a search request entered by the user via the remote client device.

4. The method of claim 1, wherein at least some of the meta-data comprises at least one of: (i) open data protocol information, (ii) an association between an entity and a service, (iii) a text label of a property entity, (iv) supported page layouts for entities, (v) a semantic attribute, (vi) an indication that a data field is associated with a telephone number, (vii) an indication that a data field is associated with an email address, (viii) an indication that a data field is associated with a Uniform Resource Locator address, or (ix) business object information.

5. The method of claim 1, wherein at least one of the potential execution platforms comprise at least one of: (i) a wireless telephone, (ii) a smartphone, (iii) a hypertext preprocessor platform, (iv) an application service provider device, or (v) a platform-specific operating system.

6. The method of claim 1, further comprising:
   arranging to download at least one application code file to the remote client device.

7. The method of claim 6, wherein at least one downloaded file is associated with an integrated development environment.

8. The method of claim 6, wherein at least one downloaded file is associated with at least one of: (i) a stand-alone application, (ii) proxy code, or (iii) a framework component.

9. The method of claim 1, further comprising:
   receiving, via the remote client device, a user selection of one of (i) a generic table user interface template, or (ii) a list style user interface template.

10. A non-transitory, computer-readable medium storing program code executable by a computer to perform a method, comprising:
    displaying, via a web-based display on a remote client device, a service list including a plurality of available services, each available service being associated with meta-data available at a server;

receiving, via the remote client device, a selection, by a first user, of at least one of the available services;

displaying, on the remote client device, a platform list including a plurality of potential execution platforms;

receiving, via the remote client device, a selection, by the first user, of one of the potential execution platforms;

displaying, on the remote client device, a list including a plurality of potential user interface formats for a user interface on the selected one of the potential execution platforms;

receiving, via the remote client device, a selection, by the first user, of one of the potential user interface formats for a user interface on the selected one of the potential execution platforms; and automatically generating, by the server, application code based on the first user's selection of at least one of the available services, the meta-data associated with the selected at least one of the available services, the first user's selection of one of the potential execution platforms and the first user's selection of one of the potential user interface formats for a user interface on the selected one of the potential execution platforms;

wherein the application code automatically generated by the server based on the first user's selection of at least one of the available services, the meta-data associated with the selected at least one of the available services, and the first user's selection of one of the potential execution platforms and the first user's selection of one of the potential user interface formats for a user interface on the selected one of the potential execution platforms includes code to allow multiple users to access and alter data from an enterprise database without a requirement for re-display of the service list that: (i) was displayed on the remote client device prior to automatically generating the application code and (ii) included the plurality of available services.

11. The medium of claim 10, wherein at least one of the available services comprise at least one of: (i) an enterprise service, (ii) a web service, (iii) a customer list web service, (iv) a sales order list web service, or (v) an employee list web service.

12. The medium of claim 10, wherein the display of available services is performed in response to a search request entered by the user via the remote client device.

13. The medium of claim 10, wherein at least some of the meta-data comprises at least one of: (i) open data protocol information, (ii) an association between an entity and a service, (iii) a text label of a property entity, (iv) supported page layouts for entities, (v) a semantic attribute, (vi) an indication that a data field is associated with a telephone number, (vii) an indication that a data field is associated with an email address, (viii) an indication that a data field is associated with a Uniform Resource Locator address, or (ix) business object information.

14. The medium of claim 10, wherein the method further comprises:

arranging to download at least one application code file to the remote client device, wherein at least one downloaded file is associated with an integrated development environment, and further wherein at least one downloaded file is associated with at least one of: (i) a stand-alone application, (ii) proxy code, or (iii) a framework component.

15. The medium of claim 10, wherein the method further comprises:

receiving, via the remote client device, a user selection of one of (i) a generic table user interface template, or (ii) a list style user interface template.

16. A system, comprising:

a back end device, including:
a service directory storing available services, and
a service N meta-data storage device storing information about the available services in the service director; and a web application device coupled to the back end device, including:
a service browser to (i) display available services to a first user, (ii) receive a selection of at least one of the available services, from the first user, (iii) display potential execution platforms to the first user, (iv) receive a selection of an execution platform from the first user, (v) display, to the first user, potential user interface formats for a user interface on the selected one of the potential execution platforms, and (vi) receive, from the first user, a selection of one of the potential user interface formats for a user interface on the selected one of the potential execution platforms, and a generation framework to automatically generate application code based on the first user's selection of at least one of the available services, the information in the service N meta-data storage device associated with the selected at least one of the available services, the first user's selection of an execution platform, and the first user's selection of one of the potential user interface formats for a user interface on the selected one of the potential execution platforms;

wherein the application code generated based on the first user's selection of at least one of the available services, the information in the service N meta-data storage device associated with the selected at least one of the available services, the first user's selection of an execution platform, and the first user's selection of one of the potential user interface formats for a user interface on the selected one of the potential execution platforms includes code to allow multiple users to access and alter data from an enterprise database without a requirement for re-display of the available services that were displayed prior to automatic generation of the application code.

17. The system of claim 16, wherein the generation framework comprises pluggable application generators associated with multiple potential execution platforms.

18. The system of claim 16, wherein service N meta-data storage device stores at least one of: (i) open data protocol information, (ii) an association between an entity and a service, (iii) a text label of a property entity, (iv) supported page layouts for entities, (v) a semantic attribute, (vi) an indication that a data field is associated with a telephone number, (vii) an indication that a data field is associated with an email address, (viii) an indication that a data field is associated with a Uniform Resource Locator address, or (ix) business object information.

19. The system of claim 16, wherein the service browser communicates with a remote client device associated with the user via the Internet.

20. The system of claim 19, wherein the generation framework is further to arrange for the application code to be transmitted to the remote client device.

21. A system comprising:
a remote client device; and
a server;

wherein the remote client device is configured to:
   display a service list including a plurality of available services, each available service being associated with meta-data available at a server;
   receive a selection, by a first user, of at least one of the available services;
   display a platform list including a plurality of potential execution platforms;
   receive a selection, by the first user, of one of the potential execution platforms;
   display a list including a plurality of potential user interface formats for a user interface on the selected one of the potential execution platforms;
   receive a selection, by the first user, of one of the potential user interface formats for a user interface on the selected one of the potential execution platforms;
wherein the server is configured to:
   automatically generate application code based on the first user's selection of at least one of the available services, the meta-data associated with the selected at least one of the available services, the first user's selection of one of the potential execution platforms, and the first user's selection of one of the potential user interface formats for a user interface on the selected one of the potential execution platforms; and
wherein the application code automatically generated by the server based on the first user's selection of at least one of the available services, the meta-data associated with the selected at least one of the available services, the first user's selection of one of the potential execution platforms, and the first user's selection of one of the potential user interface formats for a user interface on the selected one of the potential execution platforms includes code to allow multiple users to access and alter data from an enterprise database without a requirement for re-display of the service list that: (i) was displayed on the remote client device prior to automatically generating the application code and (ii) included the plurality of available services.

* * * * *